United States Patent
Ridgway et al.

(10) Patent No.: US 11,763,013 B2
(45) Date of Patent: Sep. 19, 2023

(54) TRANSACTION DOCUMENT MANAGEMENT SYSTEM AND METHOD

(71) Applicant: Workshare, Ltd., London (GB)

(72) Inventors: Ben Ridgway, London (GB); Ted Sabety, New York, NY (US)

(73) Assignee: Workshare, Ltd., London (GB)

( * ) Notice: Subject to any disclaimer, the term of this patent is extended or adjusted under 35 U.S.C. 154(b) by 0 days.

(21) Appl. No.: 15/219,693

(22) Filed: Jul. 26, 2016

(65) Prior Publication Data

US 2017/0039182 A1 Feb. 9, 2017

Related U.S. Application Data

(60) Provisional application No. 62/202,526, filed on Aug. 7, 2015.

(51) Int. Cl.
| | | |
|---|---|---|
| *G06F 21/62* | (2013.01) | |
| *G06Q 10/10* | (2023.01) | |
| *G06F 16/93* | (2019.01) | |
| *G06F 40/169* | (2020.01) | |

(52) U.S. Cl.
CPC .......... *G06F 21/6218* (2013.01); *G06F 16/93* (2019.01); *G06F 40/169* (2020.01); *G06Q 10/103* (2013.01); *G06F 2221/2139* (2013.01)

(58) Field of Classification Search
CPC ........ G06Q 10/10; G06Q 30/06; G06Q 40/02; G06Q 40/00; G06Q 10/06; G06Q 50/18; G06Q 10/103; G06F 17/243; G06F 17/30011; G06F 21/6218; G06F 21/6227; G06F 16/93; G06F 16/532; G06F 40/169; G06F 2221/2139; G06F 21/618
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Advisory Action dated Apr. 12, 2013, in Co-Pending U.S. Appl. No. 12/621,429 by More, S., filed Nov. 18, 2009.

(Continued)

*Primary Examiner* — Cesar B Paula
*Assistant Examiner* — Carl E Barnes, Jr.
(74) *Attorney, Agent, or Firm* — NIXON PEABODY LLP

(57) ABSTRACT

This invention discloses a novel system and method for transaction document management where personnel from two sides of a business transaction involving one or more documents that constitute the transaction can interact with the system in order to automate the process of tracking executed signature pages associated with the documents. In addition, the system and method automates the tracking of exceptions to at least one of the documents and associating the exception with one or more documents comprising due diligence documents that may also reside on the system.

13 Claims, 4 Drawing Sheets

(56) References Cited

U.S. PATENT DOCUMENTS

| | | | |
|---|---|---|---|
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,379,374 A | 1/1995 | Ishizaki et al. | |
| 5,446,842 A | 8/1995 | Schaeffer et al. | |
| 5,608,872 A | 3/1997 | Schwartz et al. | |
| 5,617,539 A | 4/1997 | Ludwig et al. | |
| 5,619,649 A | 4/1997 | Kovnat et al. | |
| 5,634,062 A | 5/1997 | Shimizu et al. | |
| 5,671,428 A | 9/1997 | Muranaga et al. | |
| 5,699,427 A | 12/1997 | Chow et al. | |
| RE35,861 E | 7/1998 | Queen | |
| 5,787,175 A | 7/1998 | Carter | |
| 5,787,444 A | 7/1998 | Gerken et al. | |
| 5,801,702 A | 9/1998 | Dolan et al. | |
| 5,806,078 A | 9/1998 | Hug et al. | |
| 5,819,300 A | 10/1998 | Kohno et al. | |
| 5,832,494 A | 11/1998 | Egger et al. | |
| 5,890,177 A | 3/1999 | Moody et al. | |
| 5,897,636 A | 4/1999 | Kaeser | |
| 5,898,836 A | 4/1999 | Freivald et al. | |
| 6,003,060 A | 12/1999 | Aznar et al. | |
| 6,012,087 A | 1/2000 | Freivald et al. | |
| 6,029,175 A | 2/2000 | Chow et al. | |
| 6,038,561 A | 3/2000 | Snyder et al. | |
| 6,049,804 A | 4/2000 | Burgess et al. | |
| 6,067,551 A | 5/2000 | Brown et al. | |
| 6,088,702 A | 7/2000 | Plantz et al. | |
| 6,128,635 A | 10/2000 | Ikeno | |
| 6,145,084 A | 11/2000 | Zuili et al. | |
| 6,189,019 B1 | 2/2001 | Blumer et al. | |
| 6,212,534 B1 | 4/2001 | Lo et al. | |
| 6,219,818 B1 | 4/2001 | Freivald et al. | |
| 6,243,091 B1 | 6/2001 | Berstis | |
| 6,263,350 B1 | 7/2001 | Wollrath et al. | |
| 6,263,364 B1 | 7/2001 | Najork et al. | |
| 6,269,370 B1 | 7/2001 | Kirsch | |
| 6,285,999 B1 | 9/2001 | Page | |
| 6,301,368 B1 | 10/2001 | Bolle et al. | |
| 6,317,777 B1 | 11/2001 | Skarbo et al. | |
| 6,321,265 B1 | 11/2001 | Najork et al. | |
| 6,327,611 B1 | 12/2001 | Everingham | |
| 6,336,123 B2 | 1/2002 | Inoue et al. | |
| 6,351,755 B1 | 2/2002 | Najork et al. | |
| 6,356,937 B1 | 3/2002 | Montville et al. | |
| 6,377,984 B1 | 4/2002 | Najork et al. | |
| 6,404,446 B1 | 6/2002 | Bates et al. | |
| 6,418,433 B1 | 7/2002 | Chakrabarti et al. | |
| 6,418,453 B1 | 7/2002 | Kraft et al. | |
| 6,424,966 B1 | 7/2002 | Meyerzon et al. | |
| 6,449,624 B1 | 9/2002 | Hammack et al. | |
| 6,505,237 B2 | 1/2003 | Beyda et al. | |
| 6,513,050 B1 | 1/2003 | Williams et al. | |
| 6,547,829 B1 | 4/2003 | Meyerzon et al. | |
| 6,556,982 B1 | 4/2003 | McGaffey et al. | |
| 6,560,620 B1 | 5/2003 | Ching | |
| 6,584,466 B1 | 6/2003 | Serbinis et al. | |
| 6,591,289 B1 | 7/2003 | Britton | |
| 6,594,662 B1 | 7/2003 | Sieffert et al. | |
| 6,596,030 B2 | 7/2003 | Ball et al. | |
| 6,614,789 B1 | 9/2003 | Yazdani et al. | |
| 6,658,626 B1 | 12/2003 | Aiken | |
| 6,662,212 B1 | 12/2003 | Chandhok et al. | |
| 6,738,762 B1 | 5/2004 | Chen et al. | |
| 6,745,024 B1 | 6/2004 | DeJaco et al. | |
| 6,832,202 B1 | 12/2004 | Schuyler et al. | |
| 6,918,082 B1 | 7/2005 | Gross | |
| 7,035,427 B2 | 4/2006 | Rhoads | |
| 7,085,735 B1 * | 8/2006 | Hall | G06Q 10/00 705/38 |
| 7,107,518 B2 | 9/2006 | Ramaley et al. | |
| 7,113,615 B2 | 9/2006 | Rhoads et al. | |
| 7,152,019 B2 | 12/2006 | Tarantola et al. | |
| 7,181,492 B2 | 2/2007 | Wen et al. | |
| 7,194,761 B1 | 3/2007 | Champagne | |
| 7,212,955 B2 | 5/2007 | Kirshenbaum et al. | |
| 7,233,686 B2 | 6/2007 | Hamid | |
| 7,240,207 B2 | 7/2007 | Weare | |
| 7,299,504 B1 | 11/2007 | Tiller et al. | |
| 7,321,864 B1 | 1/2008 | Gendler | |
| 7,356,704 B2 | 4/2008 | Rinkevich et al. | |
| 7,434,164 B2 | 10/2008 | Salesin et al. | |
| 7,454,778 B2 | 11/2008 | Pearson et al. | |
| 7,496,841 B2 | 2/2009 | Hadfield et al. | |
| 7,564,997 B2 | 7/2009 | Hamid | |
| 7,570,964 B2 | 8/2009 | Maes | |
| 7,613,770 B2 | 11/2009 | Li | |
| 7,624,447 B1 | 11/2009 | Horowitz et al. | |
| 7,627,613 B1 | 12/2009 | Dulitz et al. | |
| 7,640,308 B2 | 12/2009 | Antonoff et al. | |
| 7,673,324 B2 | 3/2010 | Tirosh et al. | |
| 7,680,785 B2 | 3/2010 | Najork | |
| 7,685,298 B2 | 3/2010 | Day | |
| 7,694,336 B2 | 4/2010 | Rinkevich et al. | |
| 7,707,153 B1 * | 4/2010 | Petito | G06Q 10/06 707/999.101 |
| 7,720,256 B2 | 5/2010 | Desprez et al. | |
| 7,730,175 B1 | 6/2010 | Roesch et al. | |
| 7,788,235 B1 | 8/2010 | Yeo | |
| 7,796,309 B2 | 9/2010 | Sadovsky et al. | |
| 7,818,678 B2 * | 10/2010 | Massand | G06F 17/2229 715/751 |
| 7,844,116 B2 | 11/2010 | Monga | |
| 7,857,201 B2 | 12/2010 | Silverbrook et al. | |
| 7,877,790 B2 | 1/2011 | Vishik et al. | |
| 7,890,752 B2 | 2/2011 | Bardsley et al. | |
| 7,895,166 B2 * | 2/2011 | Foygel | G06F 16/93 707/667 |
| 7,903,822 B1 | 3/2011 | Hair et al. | |
| 7,941,844 B2 | 5/2011 | Anno | |
| 7,958,101 B1 | 6/2011 | Teugels et al. | |
| 8,005,277 B2 | 8/2011 | Tulyakov et al. | |
| 8,042,112 B1 | 10/2011 | Zhu et al. | |
| 8,117,225 B1 | 2/2012 | Zilka | |
| 8,145,724 B1 | 3/2012 | Hawks et al. | |
| 8,181,036 B1 | 5/2012 | Nachenberg | |
| 8,196,030 B1 | 6/2012 | Wang et al. | |
| 8,201,254 B1 | 6/2012 | Wilhelm et al. | |
| 8,209,538 B2 | 6/2012 | Craigie | |
| 8,233,723 B2 | 7/2012 | Sundaresan | |
| 8,286,085 B1 | 10/2012 | Denise | |
| 8,286,171 B2 | 10/2012 | More et al. | |
| 8,301,994 B1 | 10/2012 | Shah | |
| 8,316,237 B1 | 11/2012 | Felsher et al. | |
| 8,406,456 B2 | 3/2013 | More | |
| 8,473,847 B2 | 6/2013 | Glover | |
| 8,478,995 B2 | 7/2013 | Alculumbre | |
| 8,555,080 B2 | 10/2013 | More et al. | |
| 8,620,872 B1 | 12/2013 | Killalea | |
| 8,635,295 B2 | 1/2014 | Mulder | |
| 8,732,127 B1 | 5/2014 | Rotterdam et al. | |
| 8,776,190 B1 | 7/2014 | Cavage et al. | |
| 8,797,603 B1 | 8/2014 | Dougherty et al. | |
| 8,839,100 B1 | 9/2014 | Donald | |
| 9,098,500 B1 | 8/2015 | Asokan et al. | |
| 9,286,403 B2 * | 3/2016 | Papa | G06F 21/62 |
| 9,311,624 B2 | 4/2016 | Diament et al. | |
| 9,652,485 B1 | 5/2017 | Bhargava et al. | |
| 2001/0018739 A1 * | 8/2001 | Anderson | G06F 17/24 713/176 |
| 2001/0039534 A1 * | 11/2001 | Keene | G06Q 20/40 705/45 |
| 2001/0042073 A1 | 11/2001 | Saether et al. | |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson, III | |

(56) References Cited

U.S. PATENT DOCUMENTS

| | | |
|---|---|---|
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1* | 4/2003 | Alley .................. G06Q 40/025 705/38 |
| 2003/0084279 A1 | 5/2003 | Campagna |
| 2003/0093755 A1 | 5/2003 | Ramakrishnan |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1* | 5/2005 | Lipman ............. G06F 17/30011 |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2005/0278421 A1 | 12/2005 | Simpson et al. |
| 2006/0005247 A1 | 1/2006 | Zhang et al. |
| 2006/0013393 A1 | 1/2006 | Ferchichi et al. |
| 2006/0021031 A1 | 1/2006 | Leahy et al. |
| 2006/0047765 A1 | 3/2006 | Mizoi et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Todd et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves et al. |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1* | 4/2007 | Ross ...................... G06Q 20/02 713/178 |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112930 A1 | 5/2007 | Foo et al. |
| 2007/0150443 A1 | 6/2007 | Bergholz et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1 | 9/2007 | Thompson et al. |
| 2007/0253608 A1 | 11/2007 | Tulyakov et al. |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0028017 A1 | 1/2008 | Garbow et al. |
| 2008/0033913 A1 | 2/2008 | Winburn |
| 2008/0034213 A1* | 2/2008 | Boemker ............... G06Q 10/10 713/176 |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1* | 4/2008 | Fuschino ............... G06Q 10/06 705/2 |
| 2008/0091735 A1* | 4/2008 | Fukushima ....... G06F 17/30011 |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1* | 1/2009 | Peirson, Jr. ............ G06Q 10/00 726/27 |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1* | 3/2009 | Mehta .................... G06F 19/327 705/2 |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0282006 A1* | 11/2009 | Misvaer ................ G06Q 10/06 |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |

(56) References Cited

U.S. PATENT DOCUMENTS

| | | |
|---|---|---|
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0059003 A1* | 2/2015 | Bouse ................ G06F 21/32 726/28 |
| 2015/0172058 A1* | 6/2015 | Follis ................ H04L 9/3247 713/176 |
| 2015/0295922 A1* | 10/2015 | Dunn ................ G06F 16/93 713/178 |
| 2016/0026965 A1* | 1/2016 | Beresford-Wood ... G06Q 40/12 705/7.15 |
| 2016/0350270 A1* | 12/2016 | Nakazawa ............ G06F 17/241 |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 102008002960 | 4/2008 |
| KR | 1020080029602 | 4/2008 |
| WO | WO0060504 | 10/2000 |
| WO | 2001052473 A1 | 7/2001 |
| WO | 2002101577 A1 | 12/2002 |

OTHER PUBLICATIONS

Advisory Action dated Apr. 12, 2013, in Co-Pending U.S. Appl. No. 12/621,429 of More, S., filed Nov. 18, 2009.
Advisory Action dated Nov. 1, 2013, in Co-Pending U.S. Appl. No. 13/659,793 by More, S., filed Oct. 24, 2012.
Co-pending U.S. Appl. No. 10/023,010, filed Dec. 17, 2001.
Co-Pending U.S. Appl. No. 10/136,733, filed Apr. 30, 2002.
Co-Pending U.S. Appl. No. 12/177,043, filed Jul. 21, 2008.
Co-Pending U.S. Appl. No. 12/209,082, filed Sep. 11, 2008.
Co-Pending U.S. Appl. No. 12/209,096, filed Sep. 11, 2008.
Co-Pending U.S. Appl. No. 12/275,185, filed Nov. 20, 2008.
Co-Pending U.S. Appl. No. 12/621,429, filed Nov. 18, 2009.
Co-Pending U.S. Appl. No. 12/844,818, filed Jul. 27, 2010.
Co-Pending U.S. Appl. No. 13/306,765, filed Nov. 29, 2011.
Co-Pending U.S. Appl. No. 13/306,798, filed Nov. 29, 2011.
Co-Pending U.S. Appl. No. 13/306,819, filed Nov. 29, 2011.
Co-Pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Dominik Grolimund et al., Cryptree: A Folder Tree Structure for Cryptographic File Systems, Oct. 2-4, 2006, IEEE, pp. 189-198.
Final Office Action dated Apr. 16, 2012 in Co-Pending U.S. Appl. No. 12/177,043, filed Jul. 21, 2008.
Final Office Action dated Apr. 17, 2007 for U.S. Appl. No. 10/023,010, filed Dec. 17, 2001, now U.S. Pat. No. 7,496,841.
Final Office Action dated Apr. 17, 2007 for U.S. Appl. No. 10/023,010, filed Dec. 7, 2001, now U.S. Pat. No. 7,496,841.
Final Office Action dated Apr. 17, 2007 in Co-Pending U.S. Appl. No. 10/023,010, filed Dec. 17, 2001, now U.S. Pat. No. 7,496,841.
Final Office Action dated Aug. 12, 2011 for U.S. Appl. No. 12/209,096, filed Sep. 11, 2008.
Final Office Action dated Aug. 12, 2011 in Co-Pending U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 by More, S., filed Nov. 18, 2009.
Final Office Action dated Feb. 1, 2013 in Co-Pending U.S. Appl. No. 12/621,429 of More, S., filed Nov. 18, 2009.
Final Office Action dated Jan. 18, 2013 in Co Pending U.S. Appl. No. 12/844,818 by Glover, R., filed Jul. 27, 2010.
Final Office Action dated Jan. 18, 2013 in Co Pending U.S. Appl. No. 12/844,818 of Glover, R., filed Jul. 27, 2010.
Final Office Action dated May 10, 2012 in Co-Pending U.S. Appl. No. 12/209,082, filed Sep. 11, 2008.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
International Search Report of PCT Application No. PCT/IB2002/005821, dated Jan. 30, 2004, 6 pages.

(56) References Cited

OTHER PUBLICATIONS

International Search Report of PCT Application No. PCT/2009/064919, dated Jul. 1, 2010, 3 pages.
International Search Report of PCT Application No. PCT/IB2002/005821, dated Jan. 3, 2004, 6 pages.
International Search Report of PCT Application No. PCT/IB2002/005821, dated Jan. 30, 2004, 6 pages.
Non-Final Office Action dated Mar. 11, 2011, in Co-pending U.S. Appl. No. 12/209,096, filed Sep. 11, 2008.
Non-Final Office Action dated Mar. 16, 2006 for U.S. Appl. No. 10/023,010, filed Dec. 17, 2001, now U.S. Pat. No. 7,496,841.
Non-Final Office Action dated Mar. 16, 2006 in Co-Pending U.S. Appl. No. 10/023,010, filed Dec. 17, 2001, now U.S. Pat. No. 7,496,841.
Non-Final Office Action dated Mar. 18, 2013 in Co-Pending U.S. Appl. No. 13/659,793 by More, S., filed Oct. 24, 2012.
Non-Final Office Action dated Mar. 18, 2013 in Co-Pending U.S. Appl. No. 13/659,793 of More, S., filed Oct. 24, 2012.
Non-Final Office Action dated Mar. 20, 2006 in Co-pending U.S. Appl. No. 10/136,733, filed Apr. 30, 2002.
Non-Final Office Action dated Mar. 20, 2006 in U.S. Appl. No. 10/136,733, filed Apr. 30, 2002.
Non-Final Office Action dated May 17, 2013 in co-pending U.S. Appl. No. 13/306,765 by Mulder, S. P. M, filed Nov. 29, 2011.
Non-Final Office Action dated May 7, 2008 in Co-pending U.S. Appl. No. 10/023,010, filed Dec. 17, 2001.
Non-Final Office Action dated May 7, 2008 in Co-pending U.S. Appl. No. 10/023,010, filed Dec. 17, 2001, now U.S. Pat. No. 7,496,841.
Non-Final Office Action dated Sep. 19, 2011 for U.S. Appl. No. 12/177,043, filed Jul. 21, 2008.
Non-Final Office Action dated Sep. 19, 2011 in Co-Pending U.S. Appl. No. 12/177,043, filed Jul. 21, 2008.
Non-Final Office Action dated Sep. 19, 2012 in Co Pending U.S. Appl. No. 12/844,818 by Glover, R., filed Jul. 27, 2010.
Non-Final Office Action dated Sep. 19, 2012 in Co Pending U.S. Appl. No. 12/844,818 of Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al. filed Sep. 11, 2008.
Notice of Allowance dated Jun. 26, 2012 in Co-Pending U.S. Appl. No. 12/275,185 of More, S., filed Nov. 20, 2008.
Notice of Allowance dated Jun. 26, 2012 in Co-Pending U.S. Appl. No. 12/275,185, filed Nov. 20, 2008.
Notice of Allowance dated Mar. 13, 2013 in Co Pending U.S. Appl. No. 12/844,818 by Glover, R., filed Jul. 27, 2010.
Notice of Allowance dated Mar. 13, 2013 in Co Pending U.S. Appl. No. 12/844,818 of Glover, R., filed Jul. 27, 2010.
Notice of Allowance dated Oct. 2, 2012, in Co-Pending U.S. Appl. No. 12/275,185 by More, S., filed Nov. 20, 2008.
Notice of Allowance dated Oct. 2, 2012, in Co-Pending U.S. Appl. No. 12/275,185 of More, S., filed Nov. 20, 2008.
Notice of Allowance dated Oct. 24, 2008 in Co-pending U.S. Appl. No. 10/023,010, filed Dec. 17, 2001.
Notice of Allowance dated Oct. 24, 2008 in Co-pending U.S. Appl. No. 10/023,010, filed Dec. 17, 2001, now U.S. Pat. No. 7,496,841.
Notice of Allowance dated Sep. 25, 2013, in Co-Pending U.S. Appl. No. 13/659,817 by More, S., filed Oct. 24, 2012.
PC Magazine "Pure Intranets: Real-Time Internet Collaboration", Aug. 30, 2001.
PC Magazine "Pure Intranets: Real-Time Internet Collaboration", http://www.zdnet.com/pcmag/featuresgroupware/gpwst.htm, Aug. 30, 2001, 2 pages.
Restriction Requirement dated Jun. 30, 2006 for U.S. Appl. No. 10/136,733, filed Apr. 30, 2002.
Restriction Requirement dated Feb. 14, 2005 for U.S. Appl. No. 10/023,010, filed Dec. 17, 2001, now U.S. Pat. No. 7,496,841.
Restriction Requirement dated Feb. 14, 2005 in U.S. Appl. No. 10/023,010, filed Dec. 17, 2001, now U.S. Pat. No. 7,496,841.
Restriction Requirement dated Feb. 5, 2008 for U.S. Appl. No. 10/023,010, filed Dec. 17, 2001, now U.S. Pat. No. 7,496,841.
Restriction Requirement dated Feb. 5, 2008 in Co-Pending U.S. Appl. No. 10/023,010, filed Dec. 17, 2001, now U.S. Pat. No. 7,496,841.
Restriction Requirement dated Jun. 30, 2006 in U.S. Appl. No. 10/136,733, filed Apr. 30, 2002.
Roussev, et al., "Integrating XML and Object-based Programming for Distributed Collaboration", IEEE, 2000, pp. 254-259.
Stephen Voida et al., Share and Share Alike: Exploring the User Interface Affordances of File Sharing, Apr. 22-27, 2006, ACM, pp. 1-10.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16,2007-Oct. 19, 2007.
Tsai, et al., "A document Workspace for Collaboration and Annotation based on XML Technology", Department of Electrical Engineering, 2001, pp. 165-172.
Tsai, et al., "A Document Workspace for Collaboration and Annotation based on XML Technology", IEEE, 2000, pp. 165-172.
Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Tulyakov et al., Symmetric Hash Functions for Fingerprint Minutiae, ICAPR 2005, LNCS 3687, pp. 30-38, 2005.
Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
U.S. Appl. No. 13/789,104, filed Mar. 7, 2013, Gofman.
V Monga, B.L. Evans Perceptual image hashing via feature points: performance evaluation and tradeoffs IEEE Transactions on Image Processing, 15 (11) (2006), pp. 3453-3466.
Weiss et al., Lightweight document matching for help-desk applications, In: Intelligent Systems and their Applications, IEEE, Vo. 15, Issue:2, pp. 57-61, ISSN 1094-7167, 2000.
Wells et al., "Groupware & Collaboration Support", www.objs.com/survey/groupwar.htm, Aug. 30, 2001, 10 pages.
Written Opinion of PCT Application No. PCT/US2009/051313, dated Mar. 3, 2010, 3 pages.
Written Opinion of PCT Application No. PCT/US2009/051313, dated Mar. 3, 2010, 4 pages.
Written Opinion PCT Application No. PCT/2009/064919, dated Jul. 1, 2010, 4 pages.
Written Opinion PCT Application No. PCT/US2009/056651, dated Apr. 21, 2010, pp. 1-5.
Written Opinion PCT Application No. PCT/US2009/056668 dated Apr. 16, 2010 pp. 1-4.
Written Opinion PCT Application No. PCT/US2009/056668, dated Apr. 16, 2010, 4 pages.
Written Opinion PCT Application No. PCT/US2009/064919 dated Jul. 1, 2010, pp. 1-4 pages.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Opinion PCT Application No. PCT/US2009/065019 dated Jun. 4, 2010, pp. 1-5.
Written Opinion PCT Application No. PCT/US2009/065019, dated Jun. 4, 2010, 5 pages.
Written Opinion PCT Application No. PCT/US2010/043345 dated Apr. 28, 2011, 4 pages.

(56) References Cited

OTHER PUBLICATIONS

Written Opinion PCT/US2009/056651 dated Apr. 21, 2010, pp. 1-5.
XP-002257904, "Workshare Debuts Synergy", 2003, 3 pages.
Xuefeng Liang; et al., "Fingerprint Matching Using Minutia Polygons," Pattern Recognition, 2006, ICPR 2006, 18th International Conference on, vol. 1, No., pp. 1046-1049.
Xuefeng Liang; et al., "Fingerprint Matching Using Minutia Polygons," Pattern Recognition, 2006, ICPR 2006, 18th International Confernce on, vol. 1, No., pp. 1046-1049.
Xuefeng Liang; Tetsuo Asano; , "Fingerprint Matching Using Minutia Polygons," Pattern Recognition, 2006. ICPR 2006. 18th International Conference on , vol. 1, No., pp. 1046-1049.
Yung et al, Generating Robust Digital Signature for Image/Video Authentication, Multimedia and Security Workshop at ACM Multimedia '98, Bristol, U.K., Sep. 1998.
"3BClean" http://www.web.archive.org/web/20060216022833/http://www.3bview.com.
"EzClean—Metadata removal utility for Microsoft Office". http://web.archive.org/web/20040804113214/www.kklsoftware.com/products/ezClean/details.asp.
"MIMEsweeper Solutions" https://web.archive.org/web2002020211234/http://www.minesweeper.com/products/default.asp.
"CS MAILsweeper™ 4.3 for SMTP" by Clearswift Ltd (© 2002) www.mimesweeper.com.
"EzClean—New Features—version 3.3" http://web.archive.org/web/20040803203232/http://www.kklsoftware.com/products/ezClean/newfeatures.asp.
"EzClean 3.2—New Features" http://web.archive.org/web/20040804034917/http://www.kklsoftware.com/products/ezClean.
"EzClean FAQ" http://web.archive.org/web/20040803202332/http://www.kklsoftware.com/products/ezClean/faq.asp.
"How do I make sure that there is no embarrassing Metadata in any documents that I attach to e-mails? ezClean makes it easy!" http://web.archive.org/web/20040727132558/http:/www.kklsoftware.com.
"Lotus Announces cc:Mail for the World Wide Web; Provides EasyAccess to E-Mail via The Web" http://www.thefreelibrary.com/print/printarticle.aspx?id=17465051.
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Think Your Deletions are Gone Forever? Think Again! ezClean Makes Metadata Removal Easy!" http://web.archive.org/web/20040727132558/http:/www.kklsoftware.com.
3B Clean: What is the Problem? 3B is the solution http ://web.archive.org/web/20051201012525/http://www.3bview.com/pages/index.php.
3B Transform from 2005 http:/web.archive.org/web/20051216102451/http://www.3bview.com/pages/3bclean.php.
3BOpen Doc Making StarOffice and OpenOffice.org a viable option http://web.archive.org/web/2OO6O823O82918lhttp:llwww.3bview.com/3bopendoc.html.
3BOpenDoc—Convert documents to and from OSF http:!!web archive .org!web!2006062320 11 04!http:!!www.3 bview.com!3bopendoc_converLODF.html.
Bitform Extract SDK Jan. 2005 http://web.archive.org/web/20050830 121 253lhttp:llbitform .net/products/securesdk/.
EZclean version 3.3 Installation Guide and Admin Manual http://web.archive.org/web/20050201003914/http://www.kklsoftware.com/documentation/ezClean-AdminManual.pdf.
EzClean version 3.3 Integration Guide for use with CS MailSweeper for SMTP.
Silver, Michael A.; MacDonald, Neil. Plan to Deal with Metadata Issues with Windows Vista. Gartner, Inc.. Dec. 21, 2005.ID No. G00136321.
Simple Mail Transfer Protocol, Internet Engineering Task Force(IETF), RFC 821 (Aug. 1982).

International Search Report of PCT Application No. PCT/US2009/051313, dated Mar. 3, 2010, 3 pages.
International Search Report of PCT Application No. PCT/US2009/056651, dated Apr. 21, 2010, pp. 1-3.
International Search Report of PCT Application No. PCT/US2009/056668 dated Apr. 16, 2010, pp. 1-9.
International Search Report of PCT Application No. PCT/US2009/056668, dated Apr. 16, 2010, 9 pages.
International Search Report of PCT Application No. PCT/US2009/064919 dated Jul. 1, 2010, pp. 1-3.
International Search Report of PCT Application No. PCT/US2009/065019 dated Jun. 4, 2010, pp. 1-6.
International Search Report of PCT Application No. PCT/US2009/065019, dated Jun. 4, 2010, 6 pages.
International Search Report of PCT Application No. PCT/US2010/043345, dated Apr. 28, 2011, 3 pages.
International Search Report PCT/US2010/043345 dated Apr. 28, 2011, 3 pages.
M. Eric Johnson et al., The Evolution of the Peer-to-Peer File Sharing Industry and the Security Risks for Users, Jan. 7-10, 2008, IEEE, pp. 1-10.
Mango, "Robust Perceptual Image Hashing Using Feature Points," http://bluecoat-02/?cfru=aHR0cDovL3NpZ25hbC51Y2UudXRleGFzLmVkdS9+dmlzaGs- L2hhc2gtcGFydEkucHM=, 2003.
Mango, et al., "Perceptual Image Hashing via Feature Points: Performance Evaluation and Tradeoffs," IEEE Transactions on Image Processing, vol. 15, No. 11, Nov. 2006.
Mango, Robust Perceptual Image Hashing Using Feature Points, http://bluecoat-02/?cfru=aHR0cDovL3NpZ25hbC5IY2UudXRIeGFzLmVkdS9+dmizaGFs-L2hhc2gtcGFydEkucHM=, 2003.
Microsoft, "Microsoft XP, Product Guide", pp. 1-26, 2001.
Microsoft, "Microsoft XP, Product Guide", pp. 1-26.
Monga, "Robust Perceptual Image Hashing Using Feature Points," http://bluecoat-02/?cfru=aHR0cDovL3NpZ25hbC51Y2UudXRleGFzLmVkdS9+dmlzaGFs- L2hhc2gtcGFydEkucHM=, 2003.
Monga, "Robust Perceptual Image Hashing using Feature Points," http://bluecoat-02/?cfru=aHROcDovL3NpZ25hbC51Y2UudXRleGFzLmVkdS9+dmlzaGFs- L2hhc2gtcGFydEkucHM=, 2003.
Monga, et al., "Perceptual Image Hashing via Feature Points: Performance Evaluation and Tradeoffs," IEEE Tranactions on Image Processing, vol. 15, No. 11, Nov. 2006.
Monga, et al., "Perceptual Image Hashing via Feature Points: Performance Evaluation and Tradeoffs," IEEE Transactions on Image Processing, vol. 15, No. 11, Nov. 2006.
Monga, V. et al., Perceptual image hashing via feature points: performance evaluation and tradeoffs IEEE Transactions on Image Processing, 15 (11) (2006), pp. 3453-3466.
Nathaniel S. Good et al., Usability and privacy: a study of KaZaA P2P file-sharing, Apr. 5-10, 2003, ACM, vol. No. 5, Issue No. 1, pp. 137-144.
Non-Final Office Action dated Apr. 27, 2012 in Co-Pending U.S. Appl. No. 12/275,185, filed Nov. 20, 2008.
Non-Final office action issued for U.S. Appl. No. 13/799,067 dated Oct. 30, 2014.
Non-Final Office Action dated Apr. 26, 2013 in Co-Pending U.S. Appl. No. 13/659,817 by More, S., filed Oct. 24, 2012.
Non-Final Office Action dated Apr. 26, 2013 in Co-Pending U.S. Appl. No. 13/659,817 of More, S., filed Oct. 24, 2012.
Non-Final Office Action dated Apr. 27, 2012 in Co-Pending U.S. Appl. No. 12/275,185 of More, S., filed Nov. 20, 2008.
Non-Final Office Action dated Aug. 1, 2012 in Co-Pending U.S. Appl. No. 12/621,429, filed Nov. 18, 2009.
Non-Final Office Action dated Aug. 1, 2012 in Co-Pending U.S. Appl. No. 12/621,429 of More, S., filed Nov. 18, 2009.
Non-Final Office Action dated Aug. 13, 2013 in co-pending U.S. Appl. No. 13/306,819 by Glover, R.W., filed Nov. 29, 2011.
Non-Final Office Action dated Dec. 22, 2011 in Co-Pending U.S. Appl. No. 12/209,082.

(56) References Cited

OTHER PUBLICATIONS

Non-Final Office Action dated Dec. 6, 2012 in co-pending U.S. Appl. No. 13/306,798, filed Nov. 29, 2011.
Non-Final Office Action dated Jan. 9, 2012 in Co-Pending U.S. Appl. No. 12/177,043, filed Jul. 21, 2008.
Workshare Ltd. Workshare Protect 4.5 Admin Guide, (c) 2006.
Jain, Pravin. The class of JAVA. Aug. 12, 2010.
Classification Definitions, Data Processing: Presentation Processing of Document, Operator Interface Processing, and Screen Saver Display Processing; Feb. 2011; pp. 1-33.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Chen et al., Online Detection and Prevention of Phishing Attacks, 2006, IEEE 7 pages.
Kamouskos et al., Active Electronic Mail, 2002, ACM 6 pages.
Kaushik et al., Email Feedback: A Policy based Approach to Overcoming False Positives, 2005, 10 pages.
Stolfo et al., AMT?MET: Systems for Modeling and Detecting Errant Email. 2003, IEEE 6 pages.

\* cited by examiner

TRANSACTION DOCUMENT MANAGEMENT SYSTEM AND METHOD

PRIORITY CLAIM

This application claims priority as a non-provisional application to U.S. Provisional Application 62/202,526 filed on Aug. 7, 2015 and incorporates by reference all that it teaches herein.

FIELD OF INVENTION

The present invention generally relates to the field of transaction document management, and document management systems that may be operated by both sides of a transaction in order to automate the tedious and error-prone process of confirming executed signature pages, assembling closing sets of documents and associating exception lists in the documents to locations in the documents to which the exception applies or locations in a virtual document room where other documents associated with the exception may be located.

BACKGROUND

It is a tedious process for lawyers to manage multiple documents involved in a complex business transaction. For example, the execution of agreements in legal transactions can involve many documents with different signatories. In virtual closings, agreements are typically circulated to signatories to execute. Signatories will often return (by email) just the execution signature pages rather than the whole agreement as executed by them or the whole agreement as executed by them. The lawyer will then be required to collate each signatories' signed pages in the case of multiple signatories and combine these together into a fully executed agreement or in the case of a single signatory, combine the signature page with the agreement to form the executed agreement. Keeping check of the circulation of executable agreements and the receipt of signature pages to such agreements by multiple parties is typically monitored by the circulation of email and running ad-hoc document checklists.

It is also a tedious and error prone process for a lawyer to manage the interaction between due diligence documents uploaded to a data room and the list of representations and warranties that the lawyer has to review in a transaction document. These interact in a particular way: typically the lawyer has to determine if a given representation and warranty being made by the client has an exception to it. For example, the deal document may say "Except as noted in the Exceptions List, attached hereto as Exhibit A, the following representations and warranties are true and correct." Then there is the list of representations and warranties. One might be "There are no agreements licensing out Company's intellectual property." This may have an exception of a patent license to BigCo. That patent license has presumably been uploaded into the data room. And now the lawyer has to be sure that a reference to that license is associated with that representation in a document that will become the Exhibit A, Exceptions List. The lawyers on the other side, on review of the exception list, will want an easy way to link to those due diligence documents as they review the deal, in this case, the patent license document to BigCo. Some deals have hundreds of these exceptions. Therefore, a system and method of keeping track of agreements forming a legal transaction by organizing the exceptions list and execution of these agreements is needed.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Figure 1:
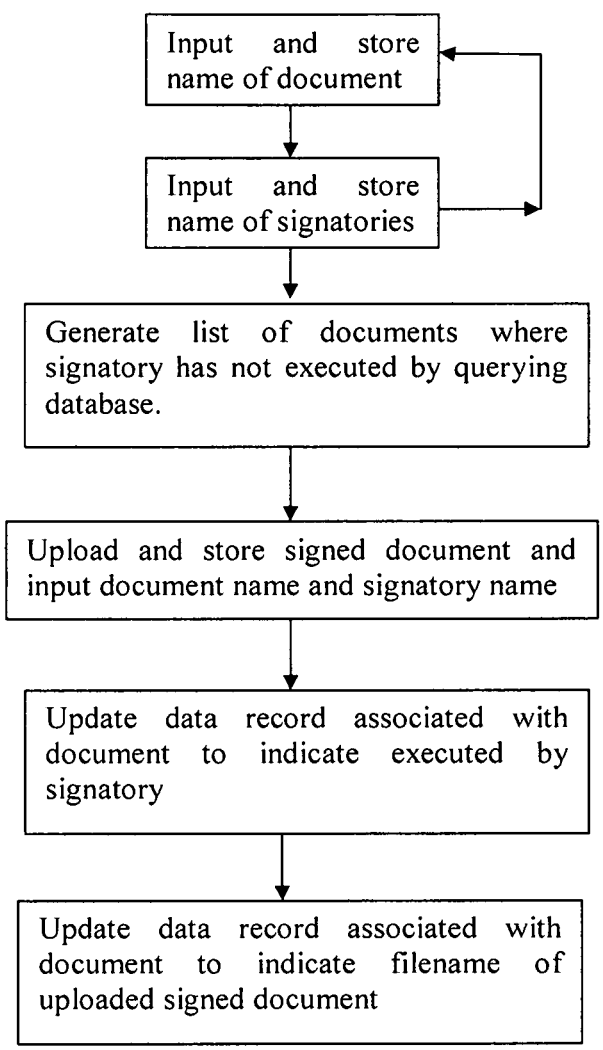
FIG. 1. Basic flowchart for tracking signature pages.
Figure 2:
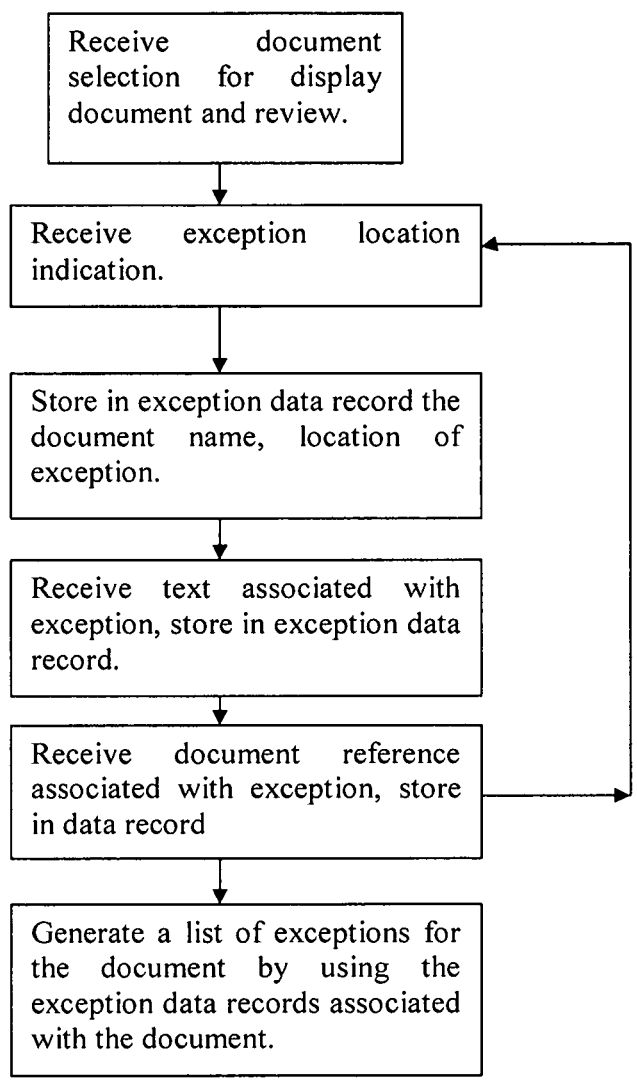
FIG. 2. Basic flowchart for tracking exceptions.
Figure 3:
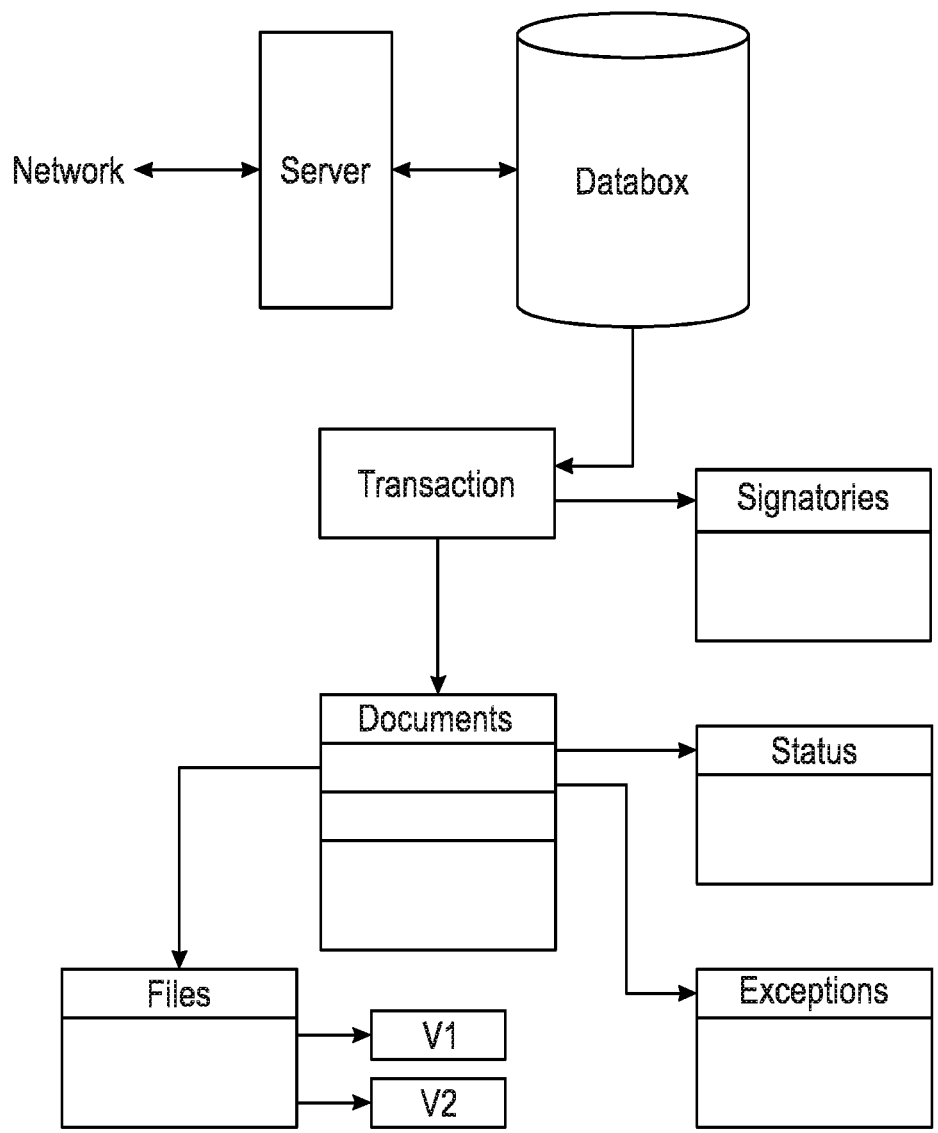
FIG. 3. Basic system architecture.
Figure 4:
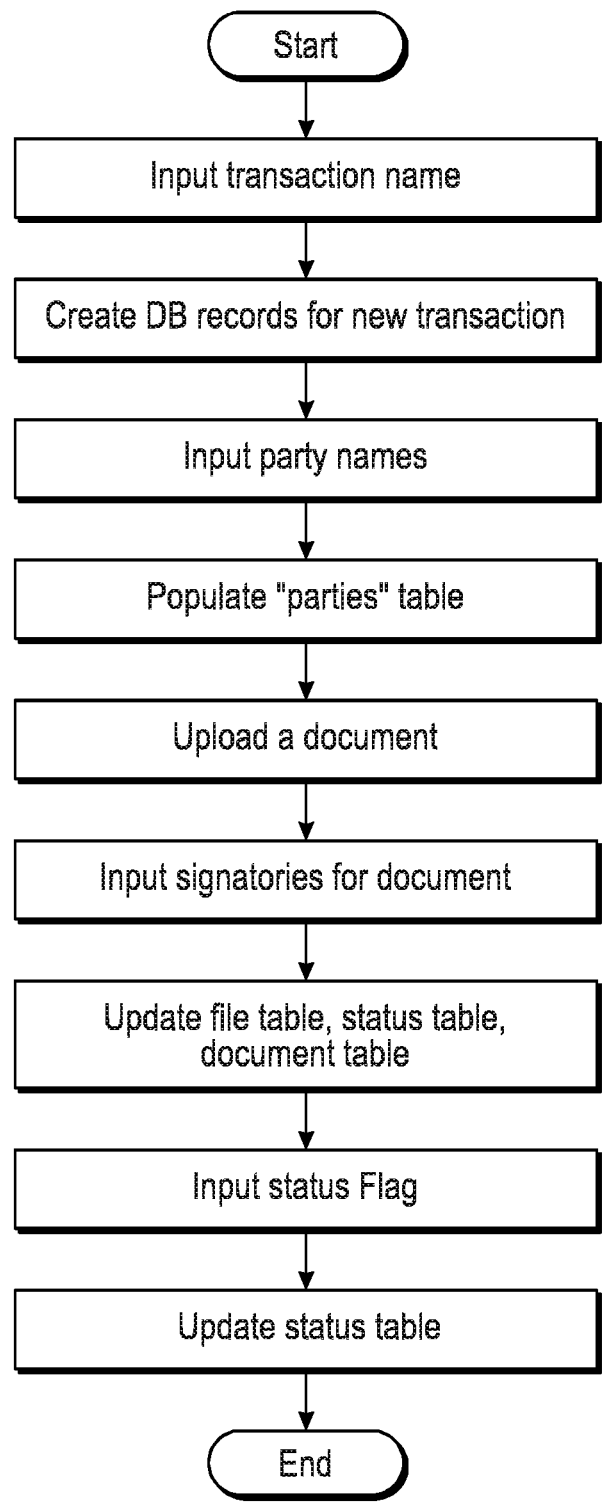
FIG. 4. Basic Flowchart for Initiating a Transaction.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The document management system operates using one or more remote computers that access a server through the use of a data network that connects the remote computers to the server. Alternatively, the users can use simple computer terminals and access the server using so-called dumb-terminal access. Other topologies of interconnection are possible by simply moving various processes from one machine to another.

In one embodiment, a server is comprised of a database that itself is comprised of one or more data records. These may be rows in relational tables or other types of database architecture. The invention will be described assuming that the database is implemented as relational tables. In this embodiment the system's database is comprised of several tables:

Parties table: This table is a list of names, in the form of text, who are designated as signatories to the transaction. The parties table may also indicate for each signatory name the name of the party they are associated with.

Document table: This table is a list of names of the documents that comprise the transaction. The document table may indicate in one or more columns for each document the parties to the document.

Parties—Document table: This table is a relational join table that identifies the signatories for each Document.

Document files table: This table lists for each document, the filenames and locations associated with each transaction document. There may be more than one file associated with the document. For example, a given document may have a reference to an "execution version" associated with the document or a "signature page" file associated with the document or an "executed signature page" file associated with the document.

The system utilizes a user interface, which is displayed on a user's computer by means of scripts or other code, typically executed by a browser program operating on the user's computer. This user interface facilitates the input of information by a user, selection of data object by a user, and the display of documents and other data on the user's computer. Using the user interface, a user may:

1. Input as text data the signatories to the agreements(s) (party name or abbreviation). The user actuates a keyboard on their computer, which populates indicated display boxes on the browser, and the browser transmits this data to the server. As a result, the server, having received the information, can store the information in the appropriate table described above, e.g. the signatories table. In one embodiment, the user has logged into the system using authentication information that associates the user with one of the parties to the transaction. As a result, the system only permits the user to add signatories associated that are associated with that party.

2. Input each agreement making up the transaction (document title) and, where necessary, select from the list of signatories the signatories required to execute the agreement(s). Based on this interaction, the system can populate the document table.

3. The user can then upload (or input a designation of a version draft) the file which comprises the execution version of each agreement to be signed by the parties to the GUI. This step designates the document as having a logical state of being "ready for execution." This logical state is a variable associated with the document in the database.

4. The system can then receive a file, typically an image file, that is a signed version of an agreement. This may be the entire agreement or just the signature page. The user interface can present as a pull-down menu a selection of which document the uploaded file is to be associated with and any pertinent notes, which may also be stored in the database in a data record associated with the document. One selection can be "executed signature page." Upon that selection, the GUI can present the user by pulldown menu a list of signatories that the user can select. In one embodiment, the user has logged into the system using authentication information that associates the user with one of the parties to the transaction. As a result, the system then presents in the pulldown selection menu, only those signatories associated with that party.

By this mechanism, the database is updated to reflect that the specific agreement was signed by that signatory. Once the user uploads a signature page to the relevant section of the checklist GUI which organizes that particular agreement's files and check off from the list of parties shown which party or parties the signature page belongs to. By doing so, the system updates a running checklist of upload signature pages for each agreement, allowing users to clearly see collected and outstanding signatures for each agreement in the transaction.

5. Additionally, upon upload of a document file, the user can designate a flag or tag to be associated with the uploaded signature page to indicate its status, such as "for review", "held in escrow", "held to order", "released". The flag would be a variable whose value represents one of these conditions.

6. The user can query the checklist by signatory to filter all signature pages belonging to such signatory or agreements where such party is yet to have a signature page uploaded in its name. Alternatively the system can present through the GUI a list of incomplete documents (the designation "ready for signature"=0) or a list of documents ready for signature ("ready for signature"=1), or a list of persons who have not completed their signatures, or a list of documents where signatures have been submitted, but are held in escrow or under review as noted in step 5. Any of the foregoing logical combinations can be selected so that a user can easily organize the completion of transaction documents and their proper execution.

It is important to note that access to the database has to be carefully controlled at several levels. Not all persons with access to the system have permission to access all of the data in the database. Rather, a person has to be authorized to view data associated with the transaction. In addition, a person who has read access has write access limited to one side of the deal. For example, a buyer and seller may have their respective personnel who have read access to the database tables associated with the transaction between buyer and seller. However, only buyer's personnel have permission to alter the signatory entries associated with the buyer, and likewise for the seller. Therefore, before any entry into or change of data in a data table received from a user interface has to be checked to confirm the identity of the user and whether the user has write privilege access to that portion of the database data table. In addition, a user associated with a party may have privilege to view documents or upload documents, but not alter the signatory table at all.

One critical security step is the upload of the executed copy of an agreement, or its signature page. In some cases, the entire document is scanned with the signed signature page. In other cases, a signature page is uploaded alone. The system GUI presents the uploading user the choice of selecting which it is. In the case of an entire document, the GUI permits the user to input the page number in the file where the signature page may be found. This data is stored in the database in the data record associated with that agreement document. For users of junior privilege, that privilege may permit the user to upload the scanned executed document or signature page. However, given their junior status, the system will automatically designate that execution version as "for review" but not permit the junior user to designate the document as "executed" by the party. This junior user might be a lawyer's secretary. This means that a more senior user of the same party will have to view the document in order to change the state of "for review" to "executed." That senior user might be a lawyer on the transaction representing the party. When a given agreement in the list has all signatories set to "executed", an additional logical value can be set and associated with the agreement representing the state of "completed." When all documents comprising the transaction are in the "completed" state, the entire transaction can have a logical state updated to indicate that the transaction is "closed."

In other embodiments of the invention, to help map the execution version of an agreement and standalone signature pages, the system will provide users with the ability to programmatically insert a visible or scannable code to the document, for example, on a cover page, header or footer or back page of the execution version of the document This code could be a UUID or barcode. In one embodiment, this code appears on the signature page. When this is done, the document table in the database is updated to associate that document with that specific code. This will allow (1) users to easily match standalone signature pages with their execution version counterpart and (2) the system to automatically recognize which agreement any uploaded signature page belongs to without the user assigning it to a particular agreement at the point of upload. In this way, signature pages can be uploaded in bulk and programmatically separated and assigned to the relevant agreements en masse. For each scanned upload of a signature page, the system can inspect the image to detect the barcode. The barcode value is matched using a database query and as a result of the matching, the system can determine how to update the document status values and further, associate the uploaded file location with the correct database entries for the document.

In another embodiment, the system can provide signature pack generation. In this embodiment, the user bookmarks/tags the relevant pages of a series of documents to be signed for any given party. For example, when the user uploads an execution version of a document, the GUI can permit the user to designate the page number of the signature page. This may be done by inputting the page number or inserting into the document on the signature page a meta-tag that the system can identify as marking the signature page. The existence of the tag can be stored in the database automatically by the system and associated with the document by using the name of the document. Once tagged the user can generate a single PDF signature pack for that party comprising the first page of each agreement (to help identify the agreement) and the signature page(s) for each agreement. In this process, the system fetches from each executed version of each document in the transaction the signature pages indicated by the tag. But the system can filter that by first selecting only those documents where a particular party is a party to that agreement. In this way, a user associated with a party can request that the system generate an output file that contains only the signature pages for that party.

In another aspect of the invention, the system can be adapted to track exceptions in one or more documents and to associate each exception with another document that can reside in a data room. A data room can be a logical location on the system, for example, a directory on the file storage system, where data files embodying information associated with the transaction are located. These are typically distinct from the transaction documents themselves. For example, property deeds, patents and other background legal documents may be stored in the data room for review by authorized users. The database is adapted to have a due diligence document table which associates each due diligence document in the data room with a title for the document and its location in the data room. Additional information may be associated with a due diligence document as further described below.

An agreement comprising a transaction may require reference to an exception. Therefore, the database is adapted to have an exception table. Each exception can be represented by a row in one or more relational tables, with the following attributes:

Exception Table:
Exception No./Exception Note text/Due Dili Doc/Document

The Exception No. is a unique index number for a specific exception.

The Exception Note is text input that the user drafts and inputs to explain the exception.

The Due Dili Doc is a hyperlink, pointer or other reference to a document stored in the data room that is associated with the exception. This may be null if there is none.

The Document entry is a reference to the transaction agreement that the exception is associated with.

Document Exception Table:
Exception no./Document pointer/Doc. Ref./Doc. Bookmark.

Document pointer: this refers to the family of files comprising the relevant deal document in the system where the representation or warranty is being made.

Document reference: this is a text input of the document section number where the representation is being made and the exception applies to.

Document bookmark: this is an optional hyperlink/bookmark that the system can use to automatically display the specific location in the document where the exception applies.

The transaction document management system is adapted to use the user interface, or GUI, to populate these tables. For example, a user may review an agreement and identify a statement to which an exception should apply. The user can then select an input into the GUI, which transmits a command up to the server to cause a new row in the exception table to be created (or some other data record to be associated with the exception). An exception index number is then created sequentially and stored in the table. The user interface then receives through a text input window an explanatory text input by the user. This is transmitted up to the server and gets stored in the Exception text entry of the table. In addition, a new row is created in the document exception table. The row has the exception index that has been created and the reference of the document being review to which the exception applies. The user can either manually enter the agreement section number reference, which also gets stored in the exception table in the row associated with the document. Alternatively, the user can select using a cursor on a location of the displayed document, where the exception applies. In this case, the GUI obtains an internal reference in the document which is then transmitted to the server and stored in the document exception table.

The user interface also permits the reviewing user to open a selection box that presents a list of the documents in the data room. The user can then select a document from that list, and that selection is then stored in the exception table in a row associated with the exception so that the exception now can be associated with that document in the data room that is relevant to it.

In one embodiment, the user workflow with the system is described as follows:

As the user reads through a deal document with representations or warranties, the user does the following when he/she decides that there is an exception to the representation:

User presses a radio button on the gui: Add Exception.

It opens a window for text input, and user inputs section number.

Or, user clicks on a location in the displayed document, system inputs the hyperlink and generates the section number text input automatically, and the system populates the entries in the GUI.

System Opens Another Text Input Window

User inputs explanation text or cancel if there is no text to add.

User reviews, clicks OK and a the text is stored in locally, using the GUI.

GUI displays the entire exception entry, i.e. the document name, section number and text explanation.

User clicks OK for the entire exception entry, and the system creates a new row entry in the Exception and Document Exception tables using that data. The system generates column entries, e.g. pointer to document, text section reference, book mark reference.

System displays through the GUI a radio button "add data room reference"

User clicks, which opens a browse window automatically showing the root of the due diligence data room directory associated with the transaction.

User selects appropriate folder or file, clicks OK, then the system then takes the reference to that file or folder and inputs it into the row of the exception table.

In another embodiment, the system can have the due diligence document reference link to a location in the due diligence document. In this embodiment:

System opens text box window, user types in section number of due dili doc., or cancel. Alternatively, the system displays the due diligence document, user moves their cursor or scrolls to the appropriate location, clicks, and the system generates a section number text item and bookmark location, and populates the entries in the GUI. In yet another embodiment, the user can select a rectangular region in the due diligence document to be associated with the exception and have the coordinates of that rectangle stored in the exception table. When the user clicks OK, the system populates the row of the exception entry with those references.

Generating the Exception List Exhibit Output:

The system has a GUI selection item that will generate a new document, called the Exceptions List. This document is cross referenced in the system with the transaction and the specific document in the deal it relates to. Therefore, each row in the Exception table has a transaction reference it has a Exception List No./Deal reference/Document reference/ file pointer as columns. The system essentially squashes the relational tables into one flat table, where each exception is listed in the order of the section numbers of the document. In other words, the system applies a sorting process where the exceptions are listed by section number in the document. The formatting can be automatically applied based on a selected formatting template, much as auto-formatting is done in Microsoft Word:

Title of Document
Section Number in Document.
Text of Exception Explanation
Title of related Due diligence document
Text of relevant section number of due diligence document.

In another embodiment, the exception generating process can use the links to bookmarks in the due diligence document to select the relevant region of the due diligence document and insert that region either as text or an image, into the exception list output document. The automatically generated output can be a Word document, so it may be edited at that point, or edits can be input into the text boxes of the system and the output regenerated. In some embodiments, the entire exception list for the transaction can be compiled into one output document.

The Other Side of the Deal:

The users reviewing the exception list can open a window on the GUI that shows a list of the exceptions. For example, they may open on the system the deal document itself. At that point a menu selectin may be available on the GUI that permits them to open another window with the exception list. Alternatively, there may be a visual indicator in the deal document display noting that an exception applies to the text at that location in the deal document. The user then clicks on the exception flag, and a window opens showing the text of the exception, and under it a hyperlink to the document in the due diligence data room. The reviewing user can click "OK" to move on, or click on the hyperlink to have that document open. If there is a book mark related to the due diligence document, the system automatically opens the document at the bookmark location. The system also permits the reviewing user to open another text box associated with the exception for inputting notes related to that exception. Computer security processes, for example permission values associated with the note file may be used to isolate the set of notes so saved so that the reviewing user, who may be a different party in the transaction, can avoid users associated with the other party, that is, the other side of the deal having access to them, but the reviewing user can keep track of the exceptions and their ultimate resolution, e.g. acceptable, legal issue, business issue, etc. In another embodiment, the exception table can have one or more columns associated with review of the exceptions. One column may be configured so that only users of one party may change the status of the exception in that column, and another column configured so that only users associated with the other party can input or change those status values. Furthermore, when displaying exception lists, the display can be customized so that the user requesting the exception list to be displayed, only sees the status flags that they have privilege to see.

Operating Environment:

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention. Further, the user's computer platform device may be a laptop or desktop type of personal computer. It can also be a cell phone, smart phone or other handheld device. The precise form factor of the user's computer platform device does not limit the claimed invention. Further, the customer may receive from and transmit data to the central server by means of the Internet, whereby the customer accesses an account using an Internet web-browser and browser displays an interactive web page operatively connected to the central server. The central server transmits and receives data in response to data and commands transmitted from the browser in response to the customer's actuation of the browser user interface. The program can detect the relative location of the cursor when the mouse button is actuated, and interpret a command to be executed based on location on the indicated relative location on the display when the button was pressed. Similarly, the program can detect the location of a touch on the screen. The data file may be an HTML document, the program a web-browser program and the command a hyperlink that causes the browser to request a new HTML document from another remote data network address location. The data file may also contain scripts, which are computer program commands, which are executed by the browser. The data file may also contain references to objects stored either locally or remotely that the browser may then access and display or otherwise render. The browser can thereby fetch additional data that is stored on a remote server accessed using the Internet.

The Internet is a computer network that permits customers operating a personal computer to interact with computer servers located remotely and to view content that is delivered from the servers to the personal computer as data files over the network. In one kind of protocol, the servers present webpages that are rendered on the user's computer platform using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device.

In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Examples of well known computing platforms, systems, environments, and/or configurations that may be suitable for use with the invention include, but are not limited to, personal computers, server computers, hand-held, laptop, tablet or mobile computer or communications devices such as cell phones, smart phones and PDA's, multiprocessor systems, microprocessor-based systems, set top boxes, programmable consumer electronics, network PCs, minicomputers, mainframe computers, distributed computing environments that include any of the above systems or devices, and the like. These may operate using as an operating system Windows, iOS, OSX, Android, Linux, Unix, Symbian and Blackberry including the various versions and variants thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., a scripting language, like JAVA, Java Script, an assembly language, or a high-level language such as FORTRAN, C, C++). The source code may be compiled before execution and distributed as object code that is executed on the target computer or compiled as it is executed by the target computer, in each case for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A system comprising:
    at least one computer for managing storage of a catalog of a plurality of documents of a single transaction, said catalog comprising:
        a database comprising a data structure that is comprised of a corresponding plurality of references to a corresponding plurality of data files comprising respective documents of the plurality of documents;
        a corresponding plurality of data representing a status tag for the respective documents;
        a corresponding plurality of data representing a first authorized signatory for the respective documents;
        a corresponding plurality of data representing a second authorized signatory for the respective documents;
        a corresponding plurality of data representing a title of the respective documents; and
        a corresponding plurality of references to a signature location item associated with at least one of the first or second authorized signatories for the respective documents;
    a signature module configured to:
        receive, from a remote computer operated by a user, a signature data item representing a signature,
        identify at least one of the first or the second authorized signatories associated with the user,
        present a subset of the plurality of references to the signature location item associated with the identified authorized signatories,
        determine authenticity of the signature data item,
        determine that the signature data item corresponds to the identified authorized signatories,
        store the received signature data item, receive a data file,
        scan a visual code embedded within the data file that establishes a correspondence between the received data file and a location within one of the plurality of documents associated with the received data file, and
        update the database by storing a reference to the stored received signature data item and the data file in a portion of the data structure that corresponds to the document and the identified authorized signatories; and
    said system further configured to transmit for display on a remote computer data representing a list of at least one of the plurality of documents by title and for each displayed document title in the list, an indication representing a state of the status tag associated with the displayed document title;
    a user interface module that is adapted to receive a reference to a first document in the plurality of documents and a first text item comprised of data specifying a location reference within the first document and a second text item;
    at least one data record associated with the first document that is comprised of data representing at least one exception, said at least one data record comprised of the reference to the location in the first document and the second text item received through the user interface module, comprised of a reference to a second document stored on the system that is associated with the exception, and comprised of a bookmark to the location in the first document referred to by the received location reference; and an output module that generates an exception list document by automatically listing the contents of exception data records in one output document.

2. The system of claim 1, wherein the status tag represents one of:
ready for execution, executed, original, markup.

3. The system of claim 1, wherein the signature module is further configured to:
receive as input a selection of an authorized party associated with the signature data item, and
in response to receiving the signature data item and the authorized party selection, update the status tag associated with the one of the plurality of documents to indicate that the selected authorized party has signed the one of a plurality of document.

4. The system of claim 3, wherein the system is further configured to execute a query to determine which of the plurality of documents is not associated with at least one signature data item.

5. The system of claim 3, wherein the system is further configured to prevent uploading and storage of a signature data item designated as associated with an authorized party unless the user passes a predetermined security protocol associated with that authorized party.

6. The system of claim 3, wherein the signature module is configured to prevent an ability of the user to update a status tag associated with an authorized party unless the user passes a predetermined security protocol associated with that authorized party.

7. The system of claim 6, wherein the system is further configured to execute a query to determine that all of the at least one of the plurality of documents is associated with at least one corresponding status data that indicates "signed" by the first and second authorized signatories corresponding to the at least one of the plurality of documents.

8. The system of claim 1, wherein the system is further configured to store in at least one data record in the data base a corresponding at least one meta-tag data that refers to the location of the corresponding signature data item and, upon receiving a command as input, to use the stored at least one meta-tags to generate a document file comprised of the signature pages of the plurality of documents.

9. The system of claim 8, wherein the system is further configured to determine a data set comprised of a subset of the plurality of documents that are not associated with at least one signature data item and generate a document file comprised of all of the signature data items of the at least one documents that are referred to in the determined data set.

10. The system of claim 1, wherein the at least one data record is further comprised of a bookmark to a location in the second document.

11. The system of claim 1, wherein the output module is further adapted to sort the exception list in the order of the locations in the first document and automatically format the output document to list the exceptions in the sorted order.

12. The system of claim 1, further comprising a review module that is adapted to receive a selection from a display of the first document and use the selection to determine one of the exceptions and display the text associated with the determined exception.

13. The system of claim 12, wherein the review module is further adapted so that the second user interface displays a hyperlink to a second document stored on the system and is adapted to receive a selection of such hyperlink in order that the second document is opened and displayed.

* * * * *